Figure 1:
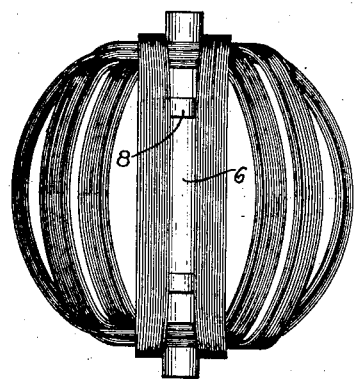

No. 829,801. PATENTED AUG. 28, 1906.
W. H. PRATT & A. LE R. ELLIS.
METHOD OF MAKING HOLLOW ARTICLES.
APPLICATION FILED MAY 24, 1904.

Witnesses:
George W. Tilden.
Helen Oxford

Inventors:
William H. Pratt,
Alvarado LeRoy Ellis,
by
Att'y.

UNITED STATES PATENT OFFICE.

WILLIAM H. PRATT AND ALVARADO LE ROY ELLIS, OF LYNN, MASSACHUSETTS, ASSIGNOR TO GENERAL ELECTRIC COMPANY, A CORPORATION OF NEW YORK.

METHOD OF MAKING HOLLOW ARTICLES.

No. 829,801.  Specification of Letters Patent.  Patented Aug. 28, 1906.

Application filed May 24, 1904. Serial No. 209,574.

*To all whom it may concern:*

Be it known that we, WILLIAM H. PRATT and ALVARADO LE ROY ELLIS, citizens of the United States, residing at Lynn, county of Essex, State of Massachusetts, have invented certain new and useful Improvements in Methods of Making Hollow Articles, of which the following is a specification.

This invention relates to a method of making hollow articles, and especially hollow articles made from a number of convolutions of wire or similar material having sufficient stiffness and rigidity to retain its shape after the supporting-body on which it is formed is withdrawn. The process is particularly useful in the manufacture of small armatures used in electric meters and measuring instruments of the motor type.

In one aspect our process consists in molding a body of material, such as paraffin, which can be reduced to a fluid or plastic state by the application of a low heat, winding or otherwise forming thereon the wire or other material which enters into the construction of the completed article, applying a coat of varnish or other suitable material to make the several convolutions of wire more nearly self-supporting, and then removing the supporting-body by applying heat thereto and allowing it to run out. The fusible body may be molded in any suitable manner and may be provided with projections integral therewith or secured thereto for the purpose of giving the desired formation to the completed article or holding the wire or other material in the proper relation until all the parts are in position, when they assist in supporting each other. The material for or the parts of the completed article may be applied to the supporting-body in any convenient manner—as, for instance, by a winding-machine if wire or similar material is used—and to facilitate this operation the body may be provided with suitable openings through which a holding device may be inserted to support the body and rotate it or move it in such other way as is necessary. If the completed article is to be used with other devices, suitable attaching means, such as a central shaft or a clamp of any kind, may be molded in the fusible body or may be inserted therein after molding. In removing the supporting-body any desired method of applying heat thereto may be pursued; but we prefer to do this by immersing it in a bath of molten paraffin or such other material as is used in making the supporting-body. Paraffin is particularly adapted for this use, as it is fluid at a comparatively low temperature, and by using the same material or materials having substantially the same specific gravity in both the bath and the supporting-body the parts of the article formed on the body are not subjected to any undue strains when the latter runs out after being reduced to a fluid state by the heat.

In one aspect our invention accordingly consists in the process of making an armature consisting of molding a body of fusible material, winding the conductors thereon, and immersing said body and the conductors thereon in a heated bath of molten material. This process is of particular utility in the manufacture of armatures for meter-motors. In electric meters it is essential that no magnetic material be used in the core of the armature and that the weight of the movable element be reduced to a minimum in order that the friction in the bearings shall be as small as possible and that there shall be the least possible increase in this friction throughout the life of the meter. To meet these requirements, armatures for use in electric meter-motors have been commonly constructed heretofore by winding the armature-conductors over a light spool consisting of a central stem, usually of wood, having thin sheet-metal end pieces thereon, giving the armature the form of a cylinder having slightly-coned ends. We have found that a spherical armature is greatly to be preferred to this type, for the reasons that with circular armature-coils the weight of the armature which forms a large part of the weight on the step-bearing of the meter is considerably reduced, since the minimum weight of wire per ampere-turn inclosing a given area is required when circular coils are used, and since the sheet-metal supports over which the coils are wound can be made much smaller, and also for the reason that making the armature spherical and the field-coils circular permits assembling these parts in a meter with a smaller clearance between them than with other forms of armatures and field-coils, thus making the maximum number of the lines of force of the field-coils effective in producing torque. We have therefore devised a process by which such a hollow spherical armature can be made at comparatively small expense; but though the process is particularly useful for this purpose and though we illustrate and describe the process as practiced to this end it must be understood that the invention is not limited in any way, but is applicable generally to the manufacture of hollow armatures of any desired shape and many other articles widely different therefrom. The details of the process and the preferred mode of practicing the same will be better understood by reference to the following description, taken in connection with the accompanying drawings.

Figure 2:
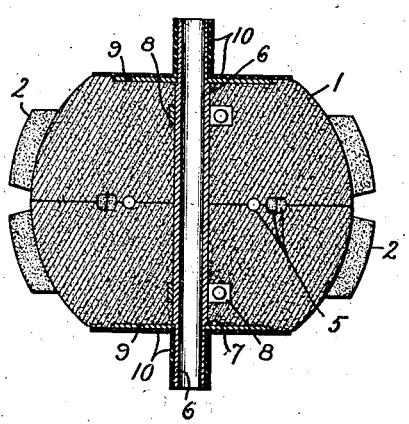

In the drawings, Figure 1 is an elevation of the completed armature. Fig. 2 is a section of the fusible supporting-body ready to receive the armature-conductors; and Figs. 3 and 4 are a plan and elevation, respectively, of the supporting-body.

Figure 3:
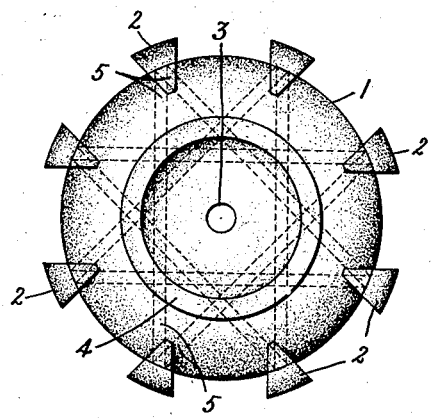
Figure 4:
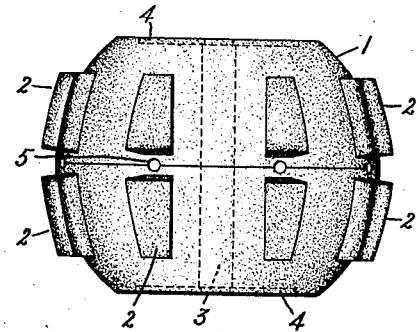

Referring first to Figs. 3 and 4, 1 indicates a body of paraffin or other similar material which can be reduced to a fluid or plastic state by heating it to a temperature so low that the article formed thereon is not injured thereby. It is formed by pouring the material when in a molten state into a suitable mold. The body is spherical except that it is flattened at opposite sides, so that the crossing of the coils at the ends will build them out, and thus make the completed armature a perfect sphere. Projections 2 are formed integral with the body 1 to space the coils apart and hold them in proper relation until all are wound. If desired, however, the projections 2 may be wooden wedges pressed into openings in the body 1 and withdrawn therefrom after all the armature-coils are wound in place. A central opening 3 is formed in the body and at each end is a shallow concentric depression 4. Transverse openings 5, as shown by dotted lines in Fig. 3, are provided through the body to secure it on a winding-machine while the coils are being wound in place. If desired for convenience in molding, the body 1 may be formed in two similar hemispherical parts, as shown by the transverse line in Figs. 2 and 4, and the two parts placed together to form the completed body. In the latter case the openings 5 may be formed by gouging a groove in the material with a suitable tool guided by a straight-edge. A central shaft is then inserted in the opening 3, and this may be the shaft of the meter or a temporary shaft to be withdrawn afterward and replaced by the meter-shaft. We prefer, however, to use a split sleeve 6 of aluminium, because of its lightness, having shoulders 7 formed thereon near its ends, and to force down over the ends of sleeve 6 and into the supporting-body one or more clamps 8, by which the armature may be secured to the shaft of the meter. Over each end of the sleeve 6 we place a thin stiff washer 9 of aluminium, which fits down into the depression 4 in the end of the body 1 and against the shoulder 7 on sleeve 6. We then insulate the outer surface of each washer 9 and the end of the sleeve 6 extending therethrough by covering them with shellacked paper 10 or other suitable insulating material. The supporting-body is then in the condition shown in Fig. 2 and is ready to receive the armature-conductors. We prefer to wind these conductors on with a winding-machine provided with a two-pronged fork to hold the body, and we secure the latter on the machine by pressing the prongs through any pair of the transverse openings 5. A coil of the armature is then wound on by revolving the body 1 and guiding the wire so that the desired number of turns are arranged in layers between two adjacent projections 2 on opposite sides of the supporting-body 1 and on either side of the sleeve 6, leads being taken off from the ends of the coil for connection to a commutator-segment and the end of another coil. The body is then withdrawn from the forked holder of the machine and turned around, so that the forks can be inserted through the next pair of openings 5, when another coil is wound on in a similar manner, and the operation is repeated until all the coils are in place. In order to hold the several convolutions together better and to make them more nearly self-supporting, we apply a suitable varnish to the wire as it is wound on. When all the coils have been properly wound and leads taken off from each one for connection to the commutator and the other coils, we apply heat to the body 1 and melt the same, so that it flows out. We prefer to do this by immersing the armature in a bath of molten paraffin or other material of substantially the same specific gravity as that of the supporting-body 1, so that no undue strain is placed upon the armature-conductors. Fig. 1 shows the armature after all the paraffin has been withdrawn from its interior. It is now ready to be secured to the meter-shaft by inserting the latter through the split sleeve 6 until in the proper position and then tightening up on the clamps 8.

As shown in Fig. 1 and as described herein, the armature is exceedingly light relatively to the amount of torque it can be made to develop, has no magnetic material in its supporting structure, and is quite strong enough for the work it must do and the strain it must withstand, and this is the type of armature which we prefer to use. However, we do not wish to be understood as limited to the process of making this or any other type of armature, as our invention is of general application to the manufacture of hollow armatures of different shapes and constructions and to other articles widely different therefrom, and we aim to cover all such applications of the invention in the claims appended hereto.

What we claim as new, and desire to secure by Letters Patent of the United States, is—

1. The process of making a coil, consisting in molding a body of fusible material, winding the coil thereon, varnishing the coil, and removing said body of fusible material by applying heat thereto.

2. The process of making an armature, consisting in molding a body of fusible material, winding the armature-conductors thereon, and removing said body by immersing said body and the conductors thereon in a heated bath of molten material.

3. The process of making an armature, consisting in molding a body of fusible material, winding the armature-conductors thereon, and removing said body by immersing said body and the conductors thereon in a bath of said material reduced to a molten state.

4. The process of making an armature, consisting in molding a body of fusible material having projections thereon, winding the armature-conductors about said body and between the projections, and applying heat to said material to remove the same.

5. The process of making an armature, consisting in molding a body of fusible material, inserting a shaft therein centrally, placing washers on the ends of the shaft and against the body, winding the armature-conductors about the body, and applying heat to the body to remove the same.

6. The process of making an armature, consisting in molding a body of fusible material, inserting a shaft therein centrally, placing washers on the ends of the shaft and against the body, insulating the washers and the ends of the shaft extending therethrough, winding the armature-conductors about the body, and applying heat to the body to remove the same.

In witness whereof we have hereunto set our hands this 21st day of May, 1904.

WILLIAM H. PRATT.
ALVARADO LE ROY ELLIS.

Witnesses:
DUGALD McK. McKILLOP,
JOHN J. WALKER.